US009128513B2

(12) United States Patent
Schuller (10) Patent No.: US 9,128,513 B2
(45) Date of Patent: Sep. 8, 2015

(54) DISPLAY OF AN ONLINE CATALOG FOR CONCURRENT DOWNLOADING OF FILES

(75) Inventor: Donald Geoffrey Schuller, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 13/368,583

(22) Filed: Feb. 8, 2012

(65) Prior Publication Data

US 2013/0205217 A1 Aug. 8, 2013

(51) Int. Cl.
*G06F 3/01* (2006.01)
(52) U.S. Cl.
CPC ........................................ *G06F 3/01* (2013.01)
(58) Field of Classification Search
CPC ... G06F 17/30058; G06F 8/61; G06F 9/4443; G06F 3/0482; G06F 3/04817; G06Q 30/0601; G06Q 20/123; H04L 67/06
USPC ......... 715/748–749, 772, 825–826, 962, 779, 715/859, 861; 717/168–178; 705/26.1
See application file for complete search history.

(56) References Cited

U.S. PATENT DOCUMENTS

| | | | | |
|---|---|---|---|---|
| 6,901,558 | B1 * | 5/2005 | Andreas et al. | 715/772 |
| 6,961,773 | B2 * | 11/2005 | Hartman et al. | 709/227 |
| 7,126,491 | B2 * | 10/2006 | Funk et al. | 340/815.45 |
| 7,398,480 | B2 | 7/2008 | Zimniewicz et al. | |
| 7,793,823 | B2 * | 9/2010 | Klein, Jr. | 235/375 |
| 8,099,332 | B2 * | 1/2012 | Lemay et al. | 705/26.1 |
| 8,190,994 | B2 * | 5/2012 | Tuli | 715/716 |
| 8,225,236 | B2 * | 7/2012 | Cho et al. | 715/859 |
| 8,370,754 | B2 * | 2/2013 | Bull et al. | 715/748 |
| 8,484,100 | B2 * | 7/2013 | Feldman et al. | 705/27.1 |
| 8,484,369 | B2 * | 7/2013 | Jones | 709/231 |
| 2007/0136679 | A1 * | 6/2007 | Yang | 715/772 |
| 2008/0040760 | A1 * | 2/2008 | Cho et al. | 725/87 |
| 2009/0183073 | A1 * | 7/2009 | Scriver et al. | 715/711 |
| 2009/0282398 | A1 * | 11/2009 | Shen et al. | 717/174 |
| 2010/0115536 | A1 | 5/2010 | Yasui | |
| 2010/0146422 | A1 * | 6/2010 | Seong et al. | 715/765 |

(Continued)

FOREIGN PATENT DOCUMENTS

WO WO-2008/154428 A1 12/2008

OTHER PUBLICATIONS

Audible, http://mobile.audible.com/usermanualiPhone.htm, as evidenced by the Internet Archive, Nov. 25, 2011, pp. 1-5.*

(Continued)

*Primary Examiner* — Andrew Tank
(74) *Attorney, Agent, or Firm* — Kilpatrick Townsend Stockton LLP (57) ABSTRACT

Example embodiments relate to provision of an online catalog of files. In example embodiments, a computing device may display an online catalog that identifies files available for download. The computing device may also output a corresponding user interface element for each file and set each user interface element to an initial state. Upon selection of a first file for download, the computing device may modify the user interface element for that file to a downloading state to indicate a status of the download while continuing to display the online catalog. Subsequently, upon selection of a second file for download, the computing device may modify the user interface element for the second file to the downloading state, such that the computing device may concurrently download multiple files.

15 Claims, 8 Drawing Sheets

(56) References Cited

U.S. PATENT DOCUMENTS

2012/0072871 A1* 3/2012 Seo et al. .................. 715/838
2012/0096386 A1* 4/2012 Baumann et al. ............. 715/772

OTHER PUBLICATIONS

Slivka, "iPad App Store Gains Search Filters, Install Buttons for Previously-Purchased Apps", http://www.macrumors.com/2011/02/04/ipad-app-store-gains-search-filters-install-buttons-for-previously-purchased-apps, as evidenced by the Internet Archive, Feb. 4, 2011, pp. 1-3.*

"On Your PC—User Guide—To Check the Download Progress of the Purchased Application or Reinstall in a Device," Samsung Apps, 2009-2011, pp. 1-11, Samsung Electronics Co., Ltd., Available at: <samsungapps.com/about/onPc.as?LOCALE=en_GB>.

Palm Pre 2 User Guide, 2009-2010, pp. 1-258 (relevant pp. 45-49), Palm, Inc.

* cited by examiner

DISPLAY OF AN ONLINE CATALOG FOR CONCURRENT DOWNLOADING OF FILES

BACKGROUND

As the availability of the Internet to various devices has increased, the ease of downloading content has also increased. Mobile phones, tablets, electronic readers, and other devices often provide access to an online catalog of files. Such online catalogs typically allow a user to purchase or otherwise obtain music, videos, electronic books, applications, and a number of other types of electronic files from any Internet-accessible location.

BRIEF DESCRIPTION OF THE DRAWINGS

The following detailed description references the drawings, wherein.

DETAILED DESCRIPTION

As detailed above, many computing devices now provide access to an online catalog that enables a user to purchase and download media, applications, and other files. In some existing file catalogs, the user is required to go to a separate screen to complete each file download. In other existing catalogs, a user selection of an application for installation minimizes the catalog and takes the user to the home screen to initiate the installation of the application. These implementations are often distracting to the user, reduce the ability of a user to initiate and monitor multiple downloads, and may lead to a decrease in total sales attributable to the owner or operator of the catalog.

Example embodiments disclosed herein address these issues by providing an online catalog that enables a user to concurrently manage the purchases and downloads for multiple files from within a single user interface. For example, in some embodiments, a computing device may display an online catalog that identifies files available for download. The computing device may also output a corresponding UI element for each file and set each UI element to an initial state. Upon selection of a first file for download, the computing device may modify the UI element for that file to a downloading state to indicate a status of the download while continuing to display the online catalog. Subsequently, upon selection of a second file for download, the computing device may modify the UI element for the second file to the downloading state, such that the computing device may concurrently download multiple files.

In some embodiments, the UI element for each file available for download is a multi-state object that modifies its appearance depending on the status of a download. For example, in an initial state, the UI element may display the purchase price of the corresponding application. Upon receipt of a user selection of an element in the initial state, the UI element may then enter the downloading state, in which the element indicates the status of the download and, in some embodiments, also enables the user to pause the download. When the file is an application, the UI element may then enter the installing state, which may indicate the installation progress of the application. Finally, the interface element may enter the launch state, such that selection of the element opens the file using the associated application or, when the file is an application, launches the application.

In this manner, example embodiments disclosed herein provide advantages to both the user and the party that operates the online catalog. In particular, the catalog enables a user to concurrently download multiple files, while remaining within a single online catalog interface. In addition, the use of a multi-state interface element for each file enables a user to concurrently control and monitor the entire process for purchasing, downloading, installing, launching, and updating multiple files or applications using a single UI element for each file. Furthermore, because the catalog enables a user to download multiple files without changing the interface context or otherwise leaving the catalog, users may purchase more files, thereby increasing revenue to the party that operates the online catalog.

Figure 1:
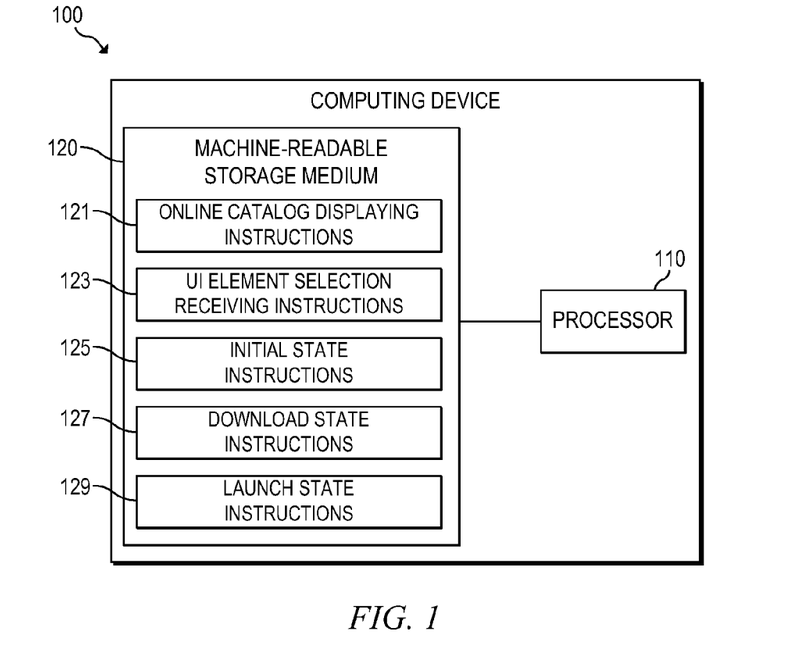
FIG. 1 is a block diagram of an example computing device for concurrently downloading multiple files using an online catalog including a multi-state user interface (UI) element for each available file.

Referring now to the drawings, FIG. 1 is a block diagram of an example computing device 100 for concurrently downloading multiple files using an online catalog including a multi-state UI element for each available file. Computing device 100 may be, for example, a notebook computer, a desktop computer, an all-in-one system, a tablet computing device, a mobile phone, an electronic book reader, or any other computing device suitable for display of a user interface on an available display device. In the embodiment of FIG. 1, computing device 100 includes a processor 110 and a machine-readable storage medium 120.

Processor 110 may be one or more central processing units (CPUs), semiconductor-based microprocessors, and/or other hardware devices suitable for retrieval and execution of instructions stored in machine-readable storage medium 120. Processor 110 may fetch, decode, and execute instructions 121, 123, 125, 127, 129 to display an online catalog of files, display a multi-state UI element for each available file, and update the state of each UI element based on user interactions. As an alternative or in addition to retrieving and executing instructions, processor 110 may include one or more electronic circuits that include electronic components for performing the functionality of one or more of instructions 121, 123, 125, 127, 129.

Machine-readable storage medium 120 may be any electronic, magnetic, optical, or other non-transitory physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. As described in detail below, machine-readable storage medium 120 may be encoded with a series of executable instructions 121, 123, 125, 127, 129 for outputting an online catalog of files and a corresponding set of multi-state UI elements.

Online catalog displaying instructions 121 may display an online catalog that identifies a plurality of files available for download to the computing device. Displaying instructions 121 may initially launch a catalog application on computing device 100 or launch a web browser and connect to the online catalog at a predetermined Uniform Resource Locator (URL). In response, displaying instructions 121 may then receive the online catalog from a remote server via the Internet, a corporate intranet, or any other network. The online catalog may be any user interface including a listing of files available for download, which may include any files that may be opened or executed on computing device 100, such as music files, video, electronic books, applications, and the like. As used herein, the term "file" in the singular may also refer to a group of files that are downloaded together (e.g., a set of application files to be installed, a music album including multiple songs, etc.). In some implementations, the catalog may enable a user to navigate between multiple screens or pages to view categories or other groupings of files available for download.

Displaying instructions 121 may also output, for each file, a corresponding UI element for controlling a process for downloading the file to a storage device of computing device 100. For example, displaying instructions 121 may display a description of each file available for download (e.g., a file name, application name, description, author or artist, rating, file size, etc.) and display a UI element proximate to the description for each file.

Each UI element may be any displayed object with which the user can interact to initiate and manage the download process. For example, the UI element may be a button of a square, rectangular, circular, or other shape that may be selected via a mouse click, touchscreen tap, or other input provided by the user. In some implementations, the UI element may be a single object that may be modified to one of a plurality of possible states depending on the status of the download for the corresponding file. In particular, as described below, instructions 125, 127, 129 may concurrently manage a multi-state UI element for each file by setting each element to an initial state, a download state, and a launch state depending on the state of the download of the corresponding file. In additional implementations detailed below with respect to FIG. 2, the multi-state UI element may also include an installing state and an update state.

UI element selection receiving instructions 123 may manage the process for receiving and responding to user input. For example, when the user provides a mouse click, touch tap, key input, or other input instruction indicating a selection of a particular UI element, receiving instructions 123 may initiate any changes of the state of the UI element, as described in detail below.

Initial state instructions 125 may set the UI element to an initial state for each file that has not yet been downloaded. For example, initial state instructions 125 may set a label associated with each UI element to a prompt that indicates the file is available for download (e.g., the text "Download") or display an appropriate symbol (e.g., a downward pointing arrow). In addition or as an alternative, initial state instructions 125 may set the label associated with each UI element to a cost for purchasing the corresponding file (e.g., "Free" or a purchase price for downloading the file). Initial state instructions 125 may display the label within the UI element (e.g., inside the boundaries of a button) or proximate to the UI element.

Upon initiation of a download for a particular file, download state instructions 127 may set the corresponding UI element to a downloading state that indicates a status of the download. For example, when receiving instructions 123 receive a selection of a particular UI element that is in the initial state, download state instructions 127 may initiate the download of the file from the server and update the UI element accordingly. Thus, download state instructions may set a label associated with the UI element to text indicating that the download is underway (e.g., "Downloading", "Download In Progress", etc.). While in the downloading state, each UI element may indicate a percentage completion of the download of the corresponding file by, for example, displaying a numerical percentage or progressively filling the UI element from one side to the other. In addition, in some implementations, each UI element may also display a pause element that, when selected, toggles the download between a paused state and an in progress state.

Note that, in some implementations, download state instructions 127 may initially determine whether the user desires to continue with the download prior to starting the download. For example, when the file is not free, download state instructions 127 may prompt the user to agree to pay for the file. Additionally, download state instructions 127 may request a user name and password and/or payment information for the purchase. After the user has agreed to pay for the file, successfully authenticated, and/or provided payment information, download state instructions 127 may then start the download and update the state of the corresponding UI element, as detailed above. Conversely, in some implementations, when the file is free, download state instructions 127 may immediately initiate the download without a prompt.

Upon completion of a download for a particular file, launch state instructions 129 may set the corresponding UI element to a launch state that enables the user to open the downloaded file from within the online catalog. For example, launch state instructions 129 may set a label associated with the UI element for the downloaded file to a prompt that indicates the file is ready to be opened (e.g., "Open", "Launch", "View", etc.) or display an appropriate symbol (e.g., an icon of a rocket launching). When a user selects a UI element that is currently in the launch state, computing device 100 may then open the corresponding file. For example, when the file is a music file or video file, device 100 may launch a media viewer in a new window and open the file using the viewer. Similarly, when the file is an electronic book, device 100 may launch an e-reader and open the book using the reader. As another example, when the file is an application, device 100 may simply launch the application in a new window.

As detailed above, computing device 100 may concurrently manage the state of each UI element in the online catalog, such that computing device 100 continues to display the current view of the online catalog without minimizing the catalog, leaving the current window, or obscuring the current interface. In this manner, computing device 100 may concurrently provide the status of multiple downloads using a single UI element for each file, while enabling the user to continue to select new files for download while other downloads are in progress. Furthermore, in some implementations, device 100 may continue to update UI elements in the background even when they are not currently viewable by the user, such that the current state of the UI elements is updated when the user restores a particular UI element to the current view.

Figure 2:
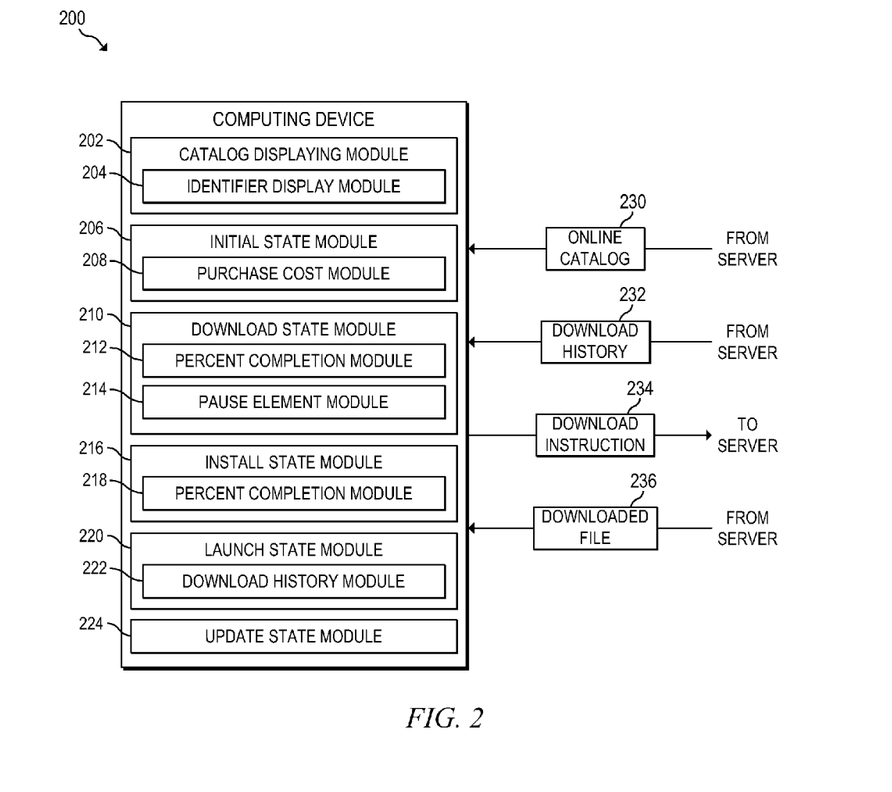
FIG. 2 is a block diagram of an example computing device for concurrently downloading multiple files using an online catalog including an interface element for each file, where each interface element includes an initial state, a download state, an install state, a launch state, and an update state.

FIG. 2 is a block diagram of an example computing device 200 for concurrently downloading multiple files using an online catalog including an interface element for each file, where each interface element includes an initial state, a download state, an install state, a launch state, and an update state. As with computing device 100 of FIG. 1, computing device 200 may be any computing device suitable for display of an online catalog user interface on an available display device.

As illustrated in FIG. 2 and described in detail below, computing device 200 may include a number of modules 202-224. Each of the modules may include a series of instructions encoded on a machine-readable storage medium and executable by a processor of computing device 200. In addition or as an alternative, each module may include one or more hardware devices including electronic circuitry for implementing the functionality described below.

As with catalog displaying instructions 121 of FIG. 1, catalog displaying module 202 may manage the process for receiving an online catalog 230 and displaying the catalog 230 on an available display device of computing device 200. Module 202 may include identifier display module 204, which may output an identifier for each available file, such as a name of the file and/or a description of the file. In some implementations, the catalog 230 may be an online application catalog, such that each of the plurality of files is an application available for installation on the computing device. In such implementations, as detailed below, install state module 216 may update the corresponding UI element during installation of an application, while update state module 224 may update the corresponding UI element when an application update is available.

Computing device 200 may also display a selectable UI element, such as a button, proximate to the displayed identifier for each available file. Each UI element may include a number of states, thereby enabling a user to concurrently monitor and control the download process for multiple files from within a unified online catalog interface. As detailed below, computing device 200 may include a series of modules 206-224 for managing these states of each UI element.

Initial state module 206 may set the UI element to the initial state for each file that has not yet been downloaded. Module 206 may further include a purchase cost module 208, which may display a label or other text indicating the price for purchasing a particular file (e.g., "Free" or a cost in U.S. dollars or another currency). Additional details regarding initial state module 206 are provided above in connection with initial state instructions 125 of FIG. 1.

Download state module 210 may set the UI element for a file to the downloading state upon initiation of the download by a user. For example, in response to a selection of a UI element that is in the initial state, download state module 210 may first confirm the download by, for example, presenting a prompt that requests payment confirmation and/or payment details when the file is not free. Download state module 210 may then initiate the download of the file by sending a download instruction 234 to the online server and may then modify the corresponding UI element to indicate the status of the download of the file 236. Percent completion module 212 may display the progress of the download as a numerical percentage, as a progress bar within the UI element, or in any other graphical manner visible to the user. In addition, pause element module 214 may output a selectable UI element that enables a user to pause the download of the application. For example, pause module 214 may display an additional UI element, such as a button, within the boundaries of the UI element corresponding to the downloading file 236. Upon selection of the pause UI element, pause module 214 may modify the label to "Paused" and instruct the server to temporarily stop sending data for the file. Additional details regarding download state module 210 are provided above in connection with download state instructions 127 of FIG. 1.

Install state module 216 may set the UI element to an installing state during installation of a file upon completion of the download of the file 236. For example, when the file 236 is an application, computing device 200 may start an installation process, which may include decompressing the downloaded files, creating folders, modifying the registry or configuration files, and creating links or shortcuts. During the install, install state module 216 may modify the UI element corresponding to the downloaded application to indicate the status of the installation. For example, install state module 216 may modify the label for the UI element to indicate that the install is in progress (e.g., a label of "Installing"). In some implementations, install state module 216 may include a percent completion module 218, which may indicate a percentage completion of the installation by, for example, displaying a numerical percentage within the UI element or progressively filling the UI element. Note that, if the installation fails, install state module 216 may modify the UI element to include a warning indicating that the installation failed (e.g., a prompt labeled "Installation Failed").

Upon completion of a successful download and/or installation of a file 236, launch state module 220 may modify the state of the corresponding UI element to the launch state. For example, launch state module 220 may modify the UI element to include a label or other prompt that indicates that the corresponding file is ready to be opened. When a user selects a UI element that is currently in the launch state, computing device 200 may then open the corresponding file. Additional details regarding launch state module 220 are provided above in connection with launch state instructions 129 of FIG. 1.

In some implementations, launch state module 220 may also include download history module 222, which may determine, while loading the online catalog, whether each of the plurality of files has already been downloaded to computing device 200. For each file that has already been downloaded and is currently installed or available on the device, download history module 222 may then set the corresponding UI element to the launch state, such that the user may launch the file from within the online catalog. For files that have been previously purchased, but are not currently installed or otherwise available on the device, download history module 222 may maintain the UI element in the initial state, but set the label associated with the UI element to "Free." As a result, the user will understand that the previously-purchased file is available to download again for free.

The method employed by download history module 222 for determining whether files have already been downloaded may vary by embodiment. In some implementations, download history module 222 may make this determination by accessing an online account of the user. For example, module 222 may obtain a complete download history 232 by accessing an online account of the user and then comparing the download history 232 with the applications listed within the online catalog. As an alternative, module 222 may individually query the server to determine whether each application currently displayed in the catalog has already been downloaded to the user's device. In other implementations, download history module 222 may locally determine whether each file has already been downloaded by accessing data local to computing device 200. For example, download history module 222 may examine one or more predetermined directories, the operating system registry, and/or another data source on computing device 200 to determine whether the corresponding file is present on the device.

Finally, computing device 200 may include update state module 224, which may set the UI element to an update state for each file for which an update is available. Update state module 224 may determine whether an update is available for each file identified in the online catalog while device 200 is loading the online catalog. For example, update state module 224 may query download history module 222 to determine which files have already been downloaded and, for each such file, query the server to determine whether an update is available. When an update is available for a given file, update state module 224 may then set the user interface element for the file to an update state and display a label or other text indicating that an update is available for the file (e.g., "Update", "Download Update", etc.). When a user selects a UI element in the update state, update state module 224 may then connect to the server, begin the process for downloading the update, and trigger download state module 210 for modification of the UI element to the download state.

As with computing device 100 of FIG. 1, computing device 200 may concurrently manage the state of each UI element in the catalog. In particular, as detailed above, state modules 206, 210, 216, 220, 224 may concurrently update the respective states for each UI element currently displayed within the online catalog. Thus, the user of computing device 200 may concurrently monitor and control the purchase, download, installation, launching, and updating for all files listed in the catalog while continuing to view the current window of the catalog.

Figure 3:
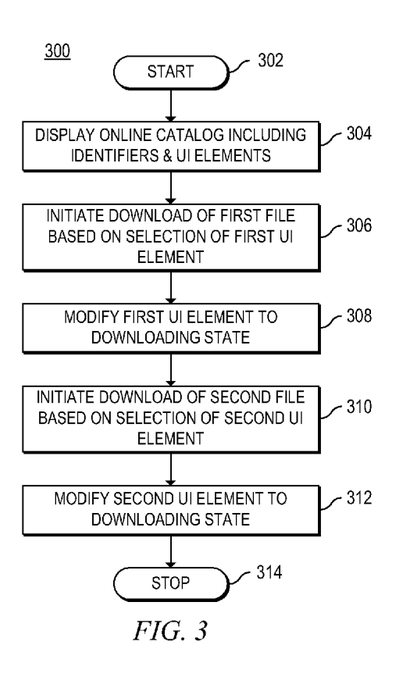
FIG. 3 is a flowchart of an example method for concurrently downloading multiple files using an online catalog including a multi-state UI element for each available file.

FIG. 3 is a flowchart of an example method 300 for concurrently downloading multiple files using an online catalog including a multi-state UI element for each available file. Although execution of method 300 is described below with reference to computing device 100 of FIG. 1, other suitable devices for execution of method 300 will be apparent to those of skill in the art (e.g., computing device 200). Method 300 may be implemented in the form of executable instructions stored on a machine-readable storage medium, such as storage medium 120, and/or in the form of electronic circuitry.

Method 300 may start in block 302 and proceed to block 304, where computing device 100 may display an online catalog that identifies a plurality of applications or other files available for installation. The displayed online catalog may also include a UI element corresponding to each identified file. As described above in connection with FIG. 1, each displayed UI element may allow the user to control and monitor the download and installation process for the corresponding file.

Next, in block 306, computing device 100 may receive a selection of a first UI element that is in the initial state and, in response, initiate a download of the corresponding file. Then, in block 308, computing device 100 may modify the first UI element to the downloading state, such that the first UI element displays the status of the download of the corresponding file. For example, the downloading state may indicate a percentage completion of the download and include a pause element that enables the user to pause the download of the file. Note that, as detailed above, computing device 100 may continue to display the current view of the application catalog, such that the user may concurrently monitor and control the download and installation process for numerous files.

Thus, in block 310, computing device 100 may receive a selection of a second UI element corresponding to a second file when the second UI element is in the initial state, while the first UI element is still in the downloading state. In response, computing device 100 may initiate the download of the second file. In block 312, computing device 100 may then modify the second UI element to the downloading state, such that the second UI element indicates the status of the download of the second file. Again, updating of the second UI element may be done concurrently with updating of the first UI element, such that the user can monitor and control both downloads from within the same screen of the online catalog.

Subsequent to block 312, computing device 300 may continue to receive selections of additional files to download and continue to update the status of the download of each file, including modifying the state of downloaded files to the install state and/or launch state. Method 300 may then continue to block 314, where method 300 stops.

Figure 4A:
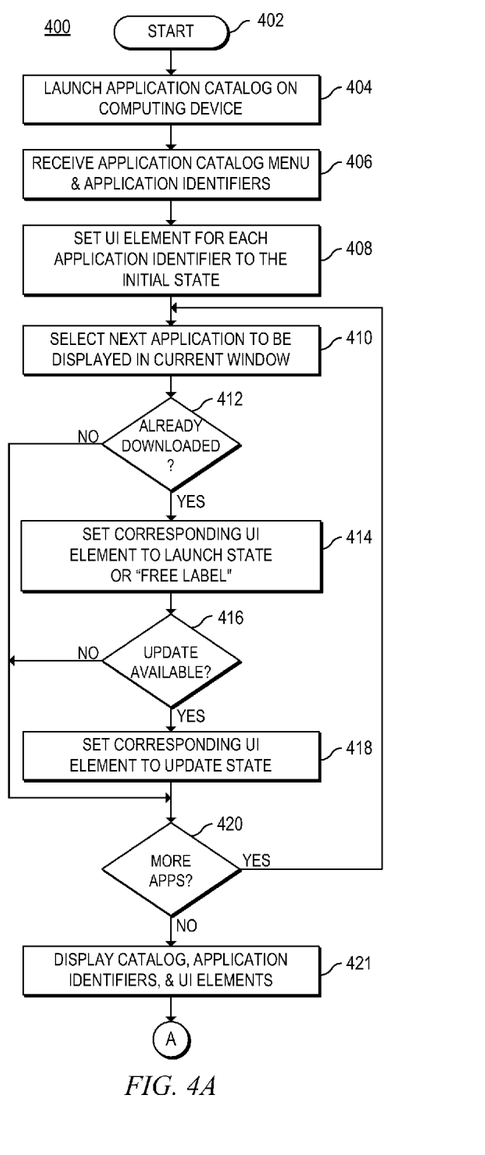
FIG. 4A is a flowchart of an example method for launching and initializing an online application catalog including a multi-state UI element for each available application.
Figure 4B:
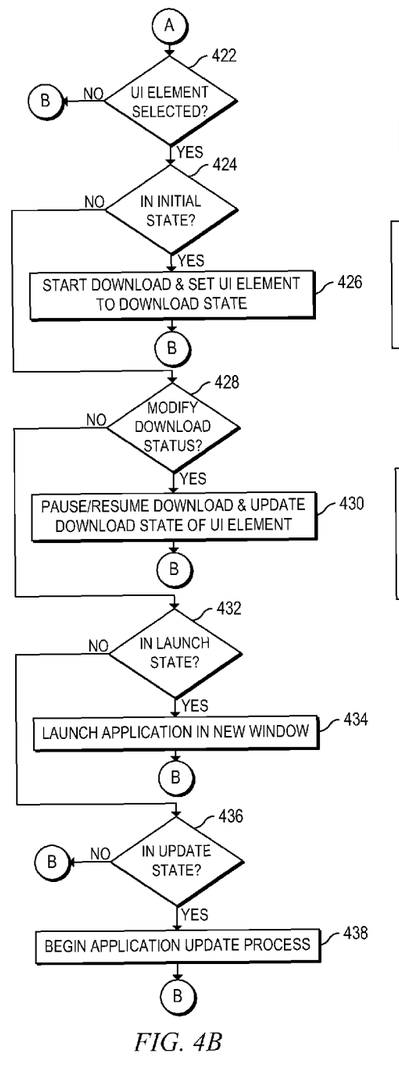
FIG. 4B is a flowchart of an example method for responding to a user selection of a particular multi-state UI element displayed in an application catalog.
Figure 4C:
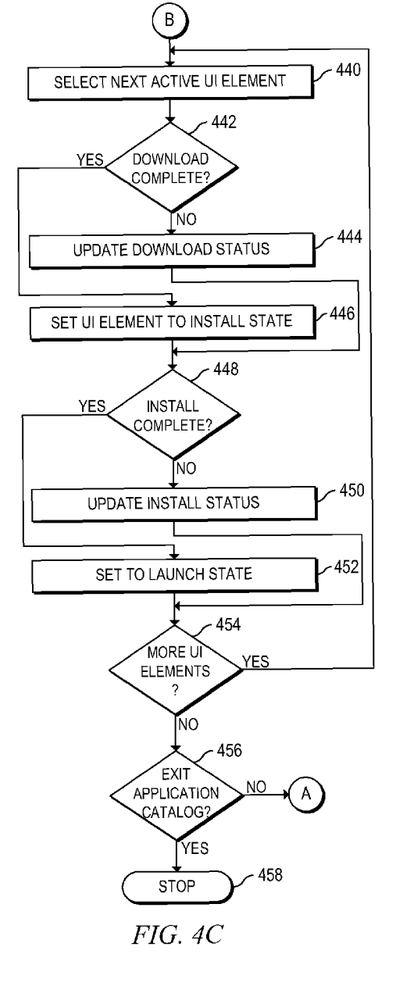
FIG. 4C is a flowchart of an example method for updating the active multi-state UI elements displayed in an application catalog.

FIGS. 4A, 4B, and 4C are flowcharts of a method 400 for displaying an application catalog, responding to user inputs, and managing the state of a number of UI elements corresponding to the available applications. Although execution of method 400 is described below with reference to computing device 200 of FIG. 2, other suitable devices for execution of method 400 will be apparent to those of skill in the art. Method 400 may be implemented in the form of executable instructions stored on a machine-readable storage medium and/or in the form of electronic circuitry. Furthermore, although described below with respect to applications, method 400 is equally applicable to all types of files, including multimedia and electronic books.

Referring now to FIG. 4A, method 400 may include a procedure for launching and initializing an online application catalog including a multi-state UI element for each available application. In particular, method 400 may start in block 402 and proceed to block 404, where computing device 200 may launch the application catalog. For example, computing device 200 may load a dedicated application for purchasing and downloading applications or load an application catalog at a predetermined URL.

Next, in block 406, computing device 200 may receive the application catalog menu and identifiers for each available application. For example, the identifiers may include the name of the application and/or a numerical identifier that uniquely identifies the application.

In block 408, computing device 200 may then initialize a UI element for each application identifier. For example, computing device 200 may instantiate a new UI element object for each of the application identifiers and assign the application identifier to the corresponding object. Computing device 200 may then initialize the UI element for each application to the initial state, such that the UI element includes a label prompting the user to start a download and/or including the price of the application.

In blocks 410 to 420, computing device 200 may then update the UI elements for any applications that have been installed or for which an update is available. In particular, in block 410, computing device 200 may select the next application to be displayed in the current window for analysis. Then, in block 412, computing device may determine whether the application has already been downloaded and installed by, for example, querying the server or inspecting local files. If the application is not installed, method 400 may skip directly to block 420, described below. Otherwise, if the application has been downloaded and installed, method 400 may continue to block 414, where computing device 200 may set the corresponding UI element to the launch state, such that the user may launch the application by selecting the UI element. Alternatively, if the application was previously purchased and installed, but has since been deleted, computing device 200 may maintain the corresponding UI element in the initial state, but change the label associated with the UI element to "Free." Method 400 may then continue to block 416.

In block 416, computing device 200 may determine whether an update is available for the application. For example, computing device 200 may send a query to the server including the application identifier requesting that the server indicate whether an update is available for the application. If so, method 400 may continue to block 418, where computing device 200 may set the corresponding UI element to the update state, such that the user may update the application by selecting the UI element. Method 400 may then continue to block 420. Alternatively, when it is determined in block 416 that an update is not available, method 400 may skip directly to block 420.

In block 420, computing device 200 may determine whether there are additional applications to analyze. If so, method 400 may return to block 410, where computing device 200 may select the next application for analysis. Otherwise, when all applications to be displayed in the current window of the catalog have been analyzed, method 400 may continue to block 421. In block 421, computing device 200 may display the catalog, the application identifiers, and the corresponding UI element for each application. Method 400 may then proceed to block 422 of FIG. 4B.

Turning now to FIG. 4B, method 400 may also include a procedure for responding to a user selection of a particular multi-state UI element displayed in an application catalog. In particular, in block 422, computing device 200 may determine whether a particular UI element has been selected in the form of a mouse click, touch tap, key press, or other input. If not, method 400 may skip to block 440 of FIG. 4C, described in detail below. Otherwise, if a particular UI element has been selected, method 400 may continue to block 424.

In block 424, computing device 200 may determine whether the selected UI element is currently in the initial state. If not, method 400 may skip directly to block 428, described in detail below. Alternatively, if the selected UI element is in the initial state, computing device 200 may first prompt the user to confirm the download and, if the application is not free, to obtain payment information or authorization to use previously-stored payment information. Upon receipt of user confirmation and/or payment, computing device 200 may then start the download and modify the UI element to the download state, such that the UI element begins to display the status of the download of the application. Method 400 may then continue to block 440 of FIG. 4C.

In block 428, computing device 200 may determine whether the selected UI element is currently in the download state and, if so, whether the user has toggled the pause element included in the UI element. If not, method 400 may skip directly to block 432, described in detail below. Alternatively, if the user has selected a pause element, computing device 200 may toggle the status of the download. Thus, if the download is currently in progress, computing device 200 may pause the download and toggle the pause element to the resume state. Conversely, if the download is currently paused, computing device 200 may resume the download and toggle the pause element to a pause state. Method 400 may then continue to block 440 of FIG. 4C.

In block 432, computing device 200 may determine whether the selected UI element is currently in the launch state. If not, method 400 may skip to block 436, described in detail below. Alternatively, if the selected UI element is in the launch state, computing device 200 may launch the corresponding application in a new window. In some implementations, computing device 200 may continue to update the application catalog while the launched application is executing and, as a result, method 400 may continue to block 440 of FIG. 4C.

In block 436, computing device 200 may determine whether the selected UI element is currently in the update state. If not, method 400 may proceed to block 440 of FIG. 4C. Alternatively, if the selected UI element is in the update state, computing device 200 may begin the update process by connecting to the server and beginning to download and install the update. In some implementations, computing device 200 may set the UI element to the download state during the download of the update and to the install state during the installation of the update. After starting the download and updating the UI element as appropriate, method 400 may continue to block 440 of FIG. 4C.

Referring to FIG. 4C, method 400 may include a procedure for updating the active multi-state UI elements displayed in an application catalog. By updating the status of each UI element currently displayed in the catalog, this procedure enables the user to concurrently monitor and control the download and installation of multiple applications.

In block 440, computing device 200 may select the next active UI element that is currently displayed, where active UI elements include those in the download or install state. Method 400 may then continue to block 442, where computing device 200 may determine whether the download for the application corresponding to the active UI element is complete. If the download is not yet complete (i.e., is still in progress), method 400 may proceed to block 444, where computing device 200 may determine the status of the download and update the UI element accordingly. For example, computing device 200 may determine the percentage completion of the download and update the UI element to indicate that percentage numerically, using a status bar, or using another technique. Method 400 may then continue to block 448, described in detail below.

Alternatively, if it is determined in block 442 that the download is complete, method 400 may continue to block 446. In block 446, because the download is complete, computing device 200 may set the UI element to the install state, assuming the UI element is not already in the install state from a previous iteration. Method 400 may then continue to block 448.

In block 448, computing device 200 may determine whether the installation process for the application corresponding to the active UI element is complete. If the installation is not yet complete (i.e., is still in progress), method 400 may proceed to block 450, where computing device 200 may determine the status of the installation and update the UI element accordingly. For example, computing device 200 may determine the percentage completion of the installation and update the UI element to display that percentage. Method 400 may then continue to block 454, described in detail below.

Alternatively, if it is determined in block 448 that the installation is complete, method 400 may continue to block 452. In block 452, computing device 200 may set the UI element to the launch state, such that the user may launch the application by selecting the UI element. Method 400 may then continue to block 454.

In block 454, computing device 200 may determine whether there are additional active UI elements to update during this iteration. If so, method 400 may return to block 440, where computing device 200 may continue the updating process for the next UI element. Otherwise, method 400 may continue to block 456. In block 456, computing device 200 may determine whether the user has provided a command to exit the application catalog. If not, method 400 may return to block 422 of FIG. 4B. Otherwise, when the user has provided a command to exit the application catalog, computing device 200 may close the application catalog and method 400 may stop in block 458.

Figure 5A:
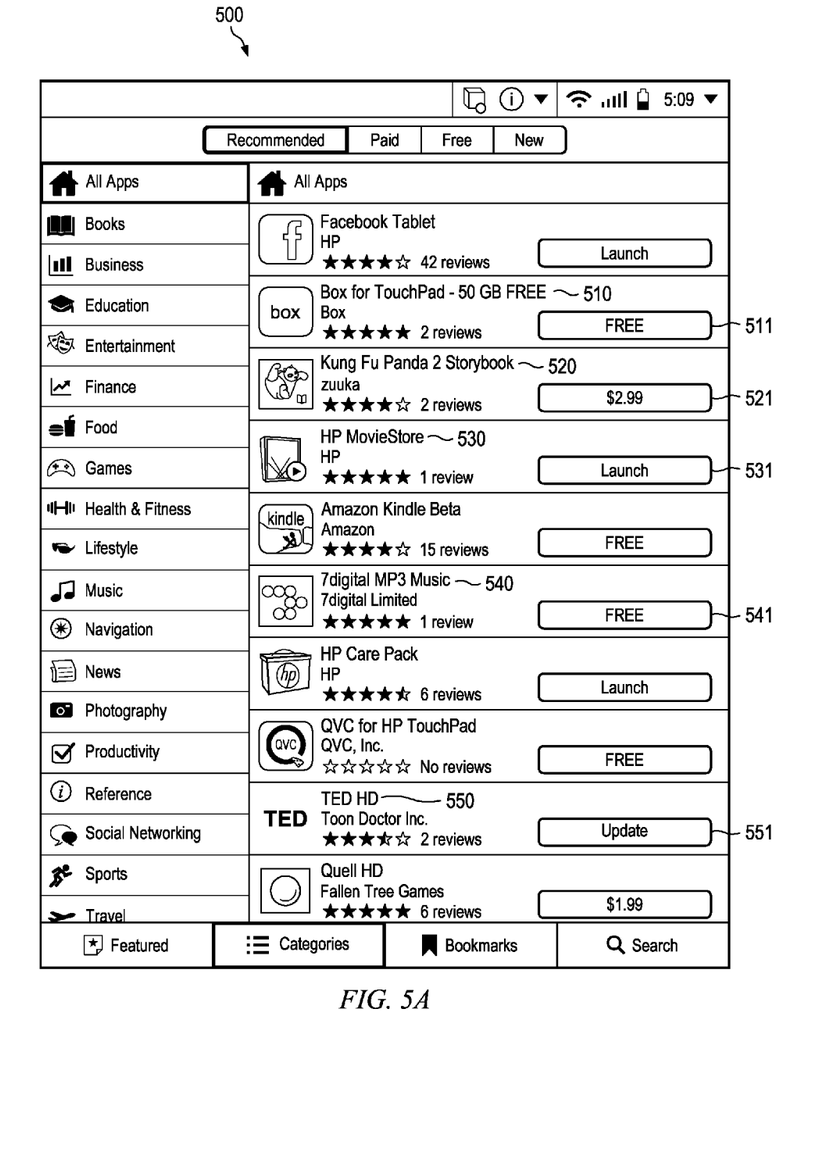
FIG. 5A is a diagram of an example application catalog including a number of applications available for download.

FIG. 5A is a diagram of an example application catalog 500 including a number of applications available for download. As illustrated, application catalog 500 lists numerous available applications, including applications 510, 520, 530, 540, 550. Consequently, catalog 500 also includes a UI element 511, 521, 531, 541, 551 for each of the applications.

For applications 510, 520, 540, each of the corresponding UI elements 511, 521, 541 is set to the initial state, such that selection of the UI element initiates the download for the corresponding application. As illustrated, UI elements 511, 521, 541 also include a listed purchase price. In particular, applications 510 and 540 are available for free, while application 520 is available for $2.99. Note that, in some scenarios, the user may have originally purchased application 540 for $2.99 and subsequently deleted the application from the device. As detailed above, the device may determine that the application was previously purchased and, as a result, list application 540 as available for free.

For application 530, the corresponding UI element 531 is set to the launch state, as the application has already been downloaded to the device. As a result, when the user selects UI element 531, the device may launch application 530 in a new window. Similarly, application 550 has also been downloaded to the device, but an update is currently available. As a result, UI element 551 is set to the update state, such that selection of the UI element triggers an update of application 550.

Figure 5B:
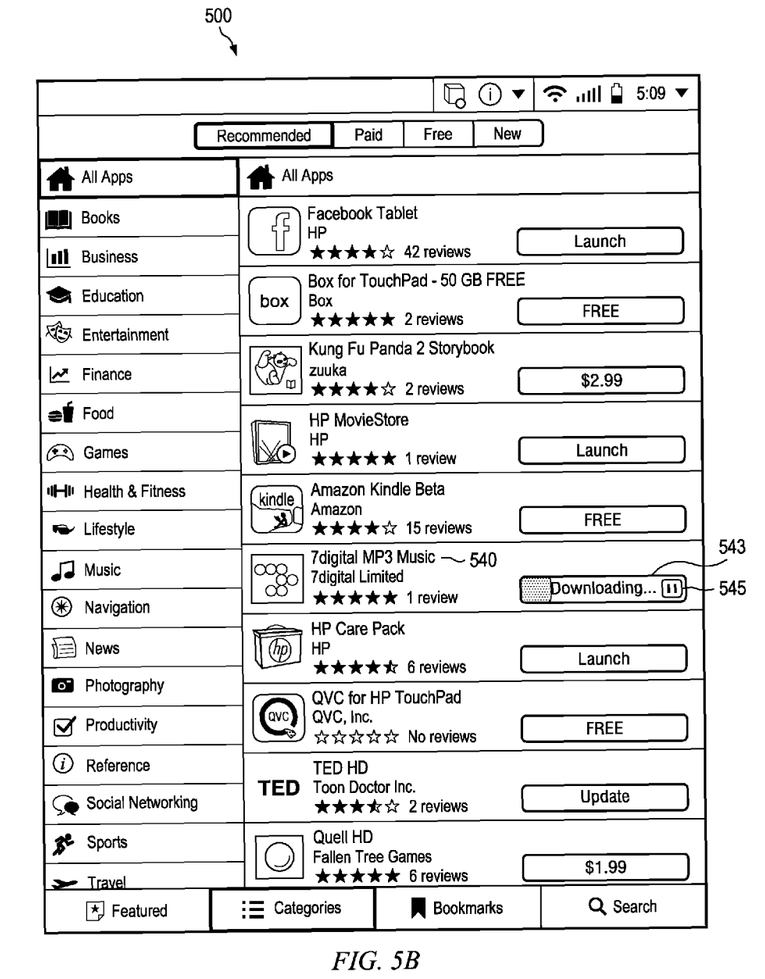
FIG. 5B is a diagram of an example application catalog during download of a first application.

FIG. 5B is a diagram of an example application catalog 500 during download of a first application 540. In FIG. 5B, the user has triggered the download of application 540 by selecting UI element 541 of FIG. 5A. Thus, as illustrated, the device has modified the UI element 543 to the downloading state, including a progress bar indicating the status of the download of the application. The device has also added a pause element 545 that, when selected, pauses the download of application 540.

Figure 5C:
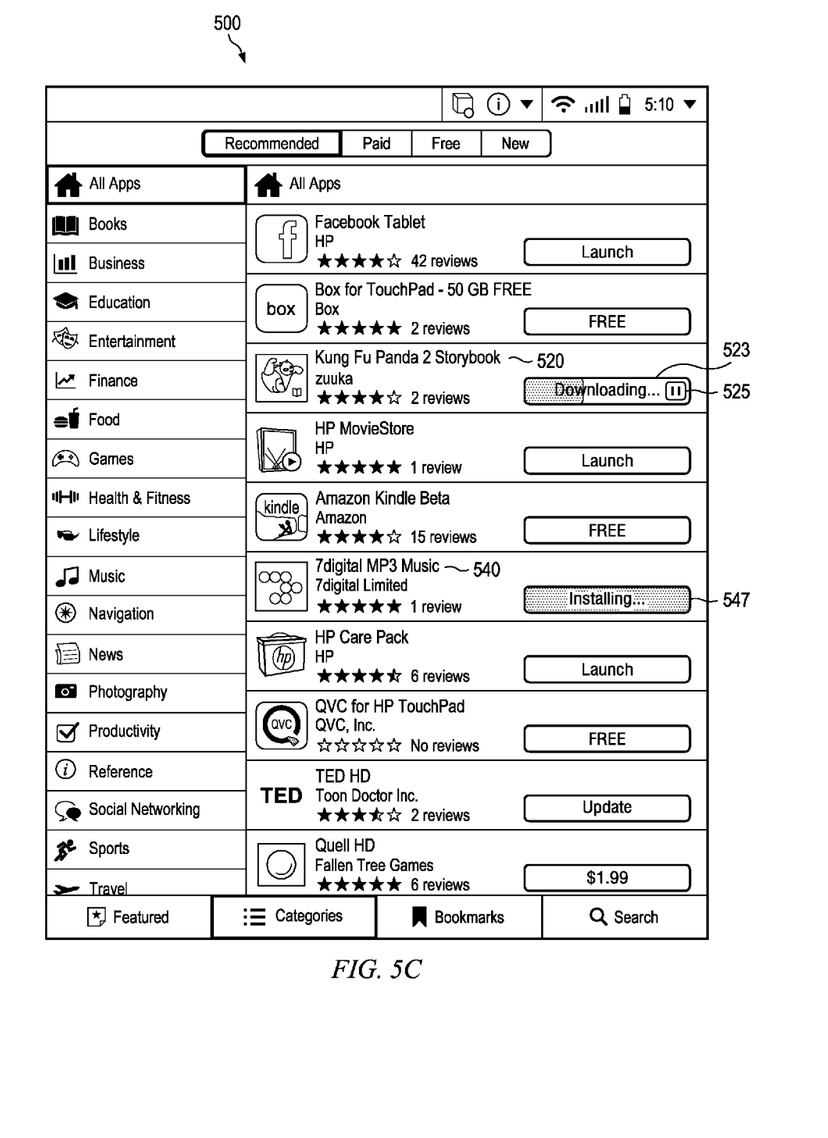
FIG. 5C is a diagram of an example application catalog during installation of a first application and download of a second application.

FIG. 5C is a diagram of an example application catalog 500 during installation of a first application 540 and download of a second application 520. In FIG. 5C, the user has triggered the download of application 520 by selecting UI element 521 of FIG. 5A. Thus, as illustrated, the device has modified the UI element 523 to the downloading state and added a pause element 525. While the download of application 520 has progressed, the device has also completed the download of application 540 and began the install process. Thus, as illustrated, the device has modified the UI element 547 to the install state to indicate that the installation of application 540 is in progress. Note that, in some implementations, UI element 547 may indicate the progress of the installation as a progress bar similar to the progress bar of UI element 523.

Figure 5D:
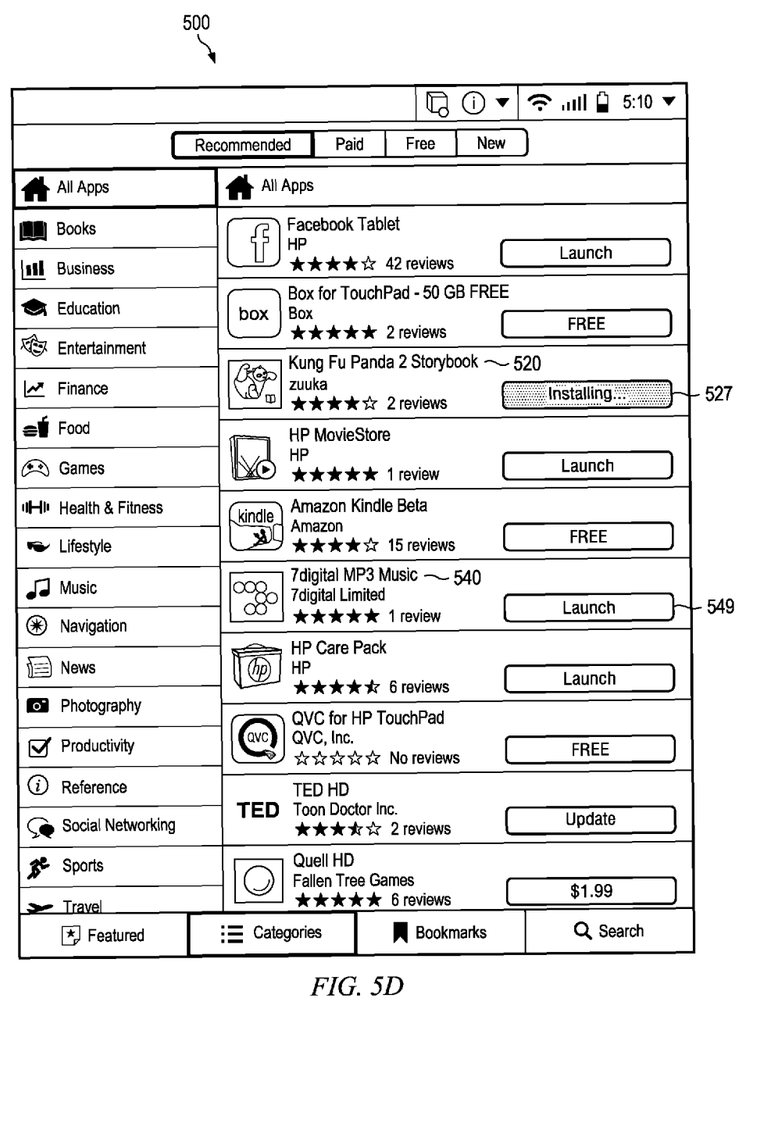
FIG. 5D is a diagram of an example application catalog subsequent to installation of a first application and during installation of a second application.

FIG. 5D is a diagram of an example application catalog subsequent to installation of a first application 540 and during installation of a second application 520. Because the device has finished the download of application 540, the device has modified the UI element 549 to the launch state. In addition, the device has completed the download of application 520 and has therefore modified UI element 527 to the install state.

The foregoing disclosure describes a number of example embodiments for an online catalog of files that includes a multi-state UI element for each available file. By utilizing such multi-state UI elements and continuing to display each UI element in a persistent catalog interface, example embodiments enable a user to concurrently manage the purchases and downloads of multiple files from within a single user interface. Example embodiments thereby provide the user with a simplified shopping experience, while also potentially increasing revenue to the party that owns or operates the online catalog. Additional embodiments and advantages of such embodiments will be apparent to those of skill in the art upon reading and understanding the foregoing description.

I claim:

1. A computing device comprising:
    a processor to:
    display an online catalog that identifies a plurality of files available for download to the computing device and a plurality of user interface elements for controlling download process of the plurality of files, wherein the plurality of user interface elements are multi-state buttons configured to receive input from a user, appearance of the multi-state buttons are modified to indicate one of a plurality of possible operational states comprising an initial state, a downloading state, and a launch state;
    receive a selection of a first user interface element among the plurality of user interface elements when the first user interface element is in the initial state, the first user interface element corresponding to a first file;
    in response to receiving the selection of the first user interface element, initiate a download of the first file to the computing device while modifying the first user interface element to the downloading state that indicates a status of the download; and
    modify the first user interface element to the launch state subsequent to the download of the first file, the launch state enabling the first file to be opened from within the online catalog when the first user interface element is selected,
    wherein the processor continues to display the online catalog and the plurality of user interface elements during the download of one or more files among the plurality of files to allow concurrent downloading of multiple files of the plurality of files.

2. The computing device of claim 1, wherein, in the initial state, at least one of the plurality of user interface elements displays a cost for purchasing its corresponding file.

3. The computing device of claim 1, wherein, in the downloading state, at least one of the plurality of user interface elements indicates a percentage completion of the download of its corresponding file.

4. The computing device of claim 3, wherein, in the downloading state, at least one of the plurality of user interface elements further displays a pause element that, when selected, pauses the download of its corresponding file.

5. The computing device of claim 1, wherein the processor is further to:
    determine, while loading the online catalog, whether each of the plurality of files has already been downloaded to the computing device; and
    set the user interface element corresponding to each already-downloaded file to the launch state to enable the corresponding file to be opened.

6. The computing device of claim 5, wherein, to determine whether each file has already been downloaded, the processor is further to:
    access an online account of a user of the computing device to determine which files have already been downloaded, or
    access data local to the computing device to determine which files have already been downloaded.

7. The computing device of claim 5, wherein, the processor is further to:
- determine, for each file that has already been downloaded, whether an update is available for the file, and
- set the user interface element corresponding to each file for which an update is available to an update state to enable a user to initiate an online update of the corresponding file.

8. The computing device of claim 1, wherein the processor is further to:
- determine, while loading the online catalog, whether each of the plurality of files has already been purchased but is not currently available on the device; and
- set a label associated with each user interface element to indicate that the download is free for each file that has been purchased but is not currently available on the device.

9. The computing device of claim 8, wherein:
- the catalog is an online application catalog and each of the plurality of files is an application available for installation on the computing device,
- the processor is further to, upon completion of the download of the first file, modify the first user interface element to an installing state that indicates a status of the installation of the application,
- the processor is further to modify the first user interface element to the launch state upon completion of the installation, and
- the online catalog continues to display the plurality of user interface elements during the download and installation of the plurality of files to allow concurrent downloading and installing of multiple applications.

10. A non-transitory machine-readable storage medium encoded with instructions executable by a processor of a computing device, the machine readable storage medium comprising:
- instructions for displaying an online catalog that identifies a plurality of files available for download to the computing device;
- instructions for outputting a plurality of user interface elements corresponding to the plurality of files available for download, wherein the plurality of user interface elements are multi-state buttons configured to receive input from a user, appearance of the multi-state buttons are modified to indicate one of a plurality of possible operational states comprising an initial state, a downloading state, and a launch state, the instructions for outputting comprising:
  - instructions for setting the user interface element to the initial state for at least one of the plurality of files that has not yet been downloaded, wherein selection of a user interface element in the initial state initiates a download of the corresponding file,
  - instructions for modifying the user interface element to the downloading state for each file currently being downloaded, the downloading state indicating a status of the download of the corresponding file, and
  - instructions for modifying the user interface element to the launch state for each file for which the download is completed,
- wherein the instructions for outputting concurrently manage the state for the plurality of user interface elements while the instructions for displaying continue to display the online catalog.

11. The non-transitory machine-readable storage medium of claim 10, wherein:
- the online catalog is an online application catalog and each of the plurality of files is an application available for installation on the computing device, and
- the instructions for outputting further comprise instructions for modifying the user interface element to an installing state subsequent to the download, the installing state indicating a status of the installation of the application.

12. The non-transitory machine-readable storage medium of claim 10, wherein the instructions for modifying the user interface element to the launch state further comprise:
- instructions for determining, while loading the online catalog, whether one or more of the plurality of files has already been downloaded and successfully installed; and
- instructions for setting the user interface element to the launch state for the one or more files that have already been downloaded and successfully installed.

13. A method for enabling concurrent installation of multiple applications on a computing device, the method comprising:
- displaying, by the computing device, an online application catalog that identifies a plurality of applications available for installation and includes a plurality of user interface elements corresponding to the plurality of applications, the plurality of user interface elements enabling a user to control installation process for their corresponding applications, wherein the plurality of user interface elements are multi-state buttons configured to receive input from a user, appearance of the multi-state buttons are modified to indicate one of a plurality of possible operational states comprising an initial state, a downloading state, and a launch state;
- initiating a first download of a first application in response to a selection of a first user interface element corresponding to the first application when the first user interface element is in the initial state;
- modifying the first user interface element to the downloading state to display a status of the first download while continuing to display the application catalog;
- initiating a second download of a second application in response to a selection of a second user interface element corresponding to the second application when the second user interface element is in an initial state and the first user interface element is in the downloading state; and
- modifying the second user interface element to a downloading state to display a status of the second download concurrently with the status of the first download.

14. The method of claim 13, further comprising:
- upon completion of the first download, modifying the first user interface element to an installation state indicating a status of installation of the first application; and
- upon completion of the second download, modifying the second user interface element to an installation state indicating a status of installation of the second application.

15. The method of claim 14, further comprising:
- upon completion of the installation of the first application, modifying the first user interface element to a launch state to enable launching of the first application from within the application catalog; and
- upon completion of the installation of the second application, modifying the second user interface element to a launch state to enable launching of the second application from within the application catalog.

\* \* \* \* \*